United States Patent
Yamagata et al.

(10) Patent No.: US 12,338,830 B1
(45) Date of Patent: Jun. 24, 2025

(54) BLOWER HOUSING, BLOWER WIRING STRUCTURE, AND BLOWER

(71) Applicant: MABUCHI MOTOR CO., LTD., Chiba (JP)

(72) Inventors: Yasuhiro Yamagata, Chiba (JP); Akiko Saito, Chiba (JP)

(73) Assignee: MABUCHI MOTOR CO., LTD., Chiba (JP)

(*) Notice: Subject to any disclaimer, the term of this patent is extended or adjusted under 35 U.S.C. 154(b) by 0 days.

(21) Appl. No.: 18/861,587

(22) PCT Filed: Feb. 7, 2024

(86) PCT No.: PCT/JP2024/004196
§ 371 (c)(1),
(2) Date: Oct. 30, 2024

(51) Int. Cl.
*F04D 25/06* (2006.01)
*F04D 19/00* (2006.01)
(Continued)

(52) U.S. Cl.
CPC ....... *F04D 25/0693* (2013.01); *F04D 19/002* (2013.01); *F04D 25/0606* (2013.01);
(Continued)

(58) Field of Classification Search
CPC ............... F04D 25/0693; F04D 19/002; F04D 25/0606; F04D 25/0613; F04D 25/0646;
(Continued)

(56) References Cited

U.S. PATENT DOCUMENTS 5,173,628 A * 12/1992 Yoshida ................. H02K 15/33
310/67 R
5,229,674 A * 7/1993 Best ....................... H02K 3/522
310/71
(Continued)

FOREIGN PATENT DOCUMENTS

CN 207819599 U 9/2018
CN 110870173 A 3/2020
(Continued)

OTHER PUBLICATIONS

International Search Report in PCT Application No. PCT/JP2024/004196 mailed Apr. 16, 2024, 5pp.
(Continued)

*Primary Examiner* — Peter J Bertheaud
(74) *Attorney, Agent, or Firm* — HAUPTMAN HAM, LLP

(57) ABSTRACT

A housing of a blower includes an accommodating portion accommodating a winding of a stator of a motor and a solder portion radially outward of an opening accommodating the stator. The accommodating portion includes: a bottom surface and an inner wall. The bottom surface includes: a first portion where a conductive wire is placed, and a second portion where the solder portion is placed. The second portion is recessed deeper than the first portion. A dimension in an axial direction from the first portion to an upper surface of the inner wall is greater than a thickness of the conductive wire in the axial direction and less than a thickness of the solder portion in the axial direction. A dimension in the axial
(Continued)

direction from the second portion to the upper surface of the inner wall is greater than the thickness of the solder portion in the axial direction.

7 Claims, 2 Drawing Sheets

(51) Int. Cl.
*F04D 25/08* (2006.01)
*F04D 29/42* (2006.01)
*F04D 29/64* (2006.01)
*H02K 3/50* (2006.01)
*H02K 3/52* (2006.01)
*H02K 5/22* (2006.01)
*H02K 11/33* (2016.01)
*H02K 21/16* (2006.01)

(52) U.S. Cl.
CPC ..... *F04D 25/0613* (2013.01); *F04D 25/0646* (2013.01); *F04D 25/08* (2013.01); *F04D 29/4206* (2013.01); *F04D 29/646* (2013.01); *H02K 3/50* (2013.01); *H02K 3/522* (2013.01); *H02K 5/225* (2013.01); *H02K 11/33* (2016.01); *H02K 21/16* (2013.01); *H02K 2203/03* (2013.01); *H02K 2211/03* (2013.01)

(58) Field of Classification Search
CPC .... F04D 25/08; F04D 29/4206; F04D 29/646; H02K 3/50; H02K 3/522; H02K 5/225; H02K 11/33; H02K 21/16; H02K 2203/03; H02K 2211/03
See application file for complete search history.

(56) References Cited

U.S. PATENT DOCUMENTS

| | | | | |
|---|---|---|---|---|
| 5,519,271 | A * | 5/1996 | Sakashita | H02K 5/225 310/71 |
| 5,924,849 | A * | 7/1999 | Kirchgessner | F04D 29/601 415/214.1 |
| 8,587,896 | B1 * | 11/2013 | Ishino | G11B 19/2009 310/71 |
| 10,605,248 | B2 * | 3/2020 | Wagner | F04D 25/062 |
| 10,971,964 | B2 * | 4/2021 | Zahora | H02K 15/085 |
| 2007/0262664 | A1 | 11/2007 | Niehaus et al. | |
| 2020/0136459 | A1 | 4/2020 | Amagi et al. | |

FOREIGN PATENT DOCUMENTS

| | | |
|---|---|---|
| CN | 212343474 U | 1/2021 |
| DE | 102006021898 A1 | 11/2007 |
| JP | 2000245093 A | 9/2000 |
| JP | 2019017227 A | 1/2019 |
| WO | 2019013030 A1 | 1/2019 |

OTHER PUBLICATIONS

Written Opinion in PCT Application No. PCT/JP2024/004196 mailed Apr. 16, 2024, 7pp.

* cited by examiner

BLOWER HOUSING, BLOWER WIRING STRUCTURE, AND BLOWER

RELATED APPLICATIONS

The present application is a National Phase of International Application No. PCT/JP2024/004196 filed Feb. 7, 2024.

TECHNICAL FIELD

The present invention relates to a blower housing that forms a case body of a blower including an impeller fixed to a rotary shaft of a motor, a blower wiring structure to which the blower housing is applied, and a blower to which the blower wiring structure is applied.

BACKGROUND ART

A structure of a blower including an impeller and a motor used as a driving source of the impeller is known in which a motor is integrated in a blower housing (hereinafter also referred to as the "housing") that forms a case body of the blower. In terms of such a housing with an integrated motor, a structure in which the housing accommodates a connection portion between a winding wound around a stator of the motor and a lead for supplying power to the winding has been proposed. For example, Patent Literature 1 discloses a structure in which a connection portion where an end of a winding and a lead are soldered is placed on an upper surface of a mount disposed above the winding. This structure is configured in such a manner that a partition is erected on the upper surface of the mount along an axial direction of the motor, thereby being able to electrically insulate and accommodate the connection portion.

CITATION LIST

Patent Literature

Patent Literature 1: JP 2000-245093 A

DISCLOSURE OF THE INVENTION

Problems to be Solved by the Invention

However, in the structure in which the connection portion is placed on the upper surface of the mount as in Patent Literature 1 described above, it is necessary to make the height of the partition provided on the upper surface of the mount greater than the outer diameter of the connection portion (in other words, the height is set at a height that secures the insulation of the connection portion). Therefore, the housing that adopts such a structure cannot avoid an increase in size in the axial direction by the height of the partition.

Hence, the known technology has room for improvement in thinning (downsizing) the housing in the axial direction.

A blower housing and blower wiring structure of the present invention have been devised in view of such a problem, and one of objects thereof is to thin (downsize) the blower housing in the axial direction. Moreover, one of objects of a blower of the present invention is to thin (downsize) the blower itself in the axial direction by thinning (downsizing) the blower housing in the axial direction. Note that objects of the present invention are not limited to these objects, but also include another object of exerting operations and effects that can be derived from configurations presented in DESCRIPTION OF PREFERRED EMBODIMENTS described below, the operations and effects being unobtainable by the known technology.

Solutions to the Problems

A blower housing, blower wiring structure, and blower of the disclosure can be realized as aspects (application examples) disclosed below, and solve at least a part of the above problem. Any of Aspects 2 to 5 is an aspect that can be additionally selected as appropriate, and is an aspect that can be omitted. Any of Aspects 2 to 5 does not disclose an aspect and configuration that are essential to the present invention.

Aspect 1. A blower housing of the disclosure is a blower housing forming a case body of a blower including a motor, and includes: an opening portion configured to accommodate a stator of the motor; and an accommodating portion formed outward of the opening portion in a radial direction in such a manner as to surround an outer periphery of the stator, the accommodating portion being configured to accommodate a winding of the stator and a solder portion where conductive wires including the winding are soldered. The accommodating portion includes: a bottom surface portion forming a surface where the conductive wires and the solder portion are placed; and an inner wall portion placed from an inner edge of the bottom surface portion in the radial direction toward a first direction in an axial direction of the stator. The bottom surface portion includes: a first portion where the conductive wire is placed; and a second portion where the solder portion is placed, the second portion is recessed to a position deeper than the first portion in a second direction in the axial direction, and a dimension in the axial direction from the first portion to an upper surface of the inner wall portion is set to be greater than a thickness of the conductive wire in the axial direction and less than a thickness of the solder portion in the axial direction, and a dimension in the axial direction from the second portion to the upper surface of the inner wall portion is set to be greater than the thickness of the solder portion in the axial direction.

Aspect 2. In the above Aspect 1, it is preferable that the accommodating portion include: an outer wall portion placed from an outer edge of the bottom surface portion in the radial direction toward the first direction; and a fixing portion formed in such a manner as to reduce spacing in the radial direction between the inner wall portion and the outer wall portion, in which the conductive wire is fixed.

Aspect 3. In the above Aspect 1 or 2, it is preferable that the first portion and the second portion be connected via an inclined surface in a circumferential direction of the accommodating portion.

Aspect 4. In the above Aspect 3, it is preferable that the fixing portion and the inclined surface be placed at positions where the fixing portion and the inclined surface overlap each other at least partly as viewed in the axial direction.

Aspect 5. In any of the above Aspects 1 to 4, it is preferable that the bottom surface portion include a plurality of the second portions, and that the solder portion be placed on each of the second portions.

Aspect 6. A blower wiring structure of the disclosure includes: the blower housing according to any of the above Aspects 1 to 5; and the stator accommodated in the blower housing, in which the winding of the stator and the solder portion where the conductive wires including the winding are soldered are accommodated in the accommodating portion of the blower housing.

Aspect 7. A blower of the disclosure includes: an impeller fixed to a rotary shaft of a motor; and the blower wiring structure according to the above Aspect 6.

Effects of the Invention

According to the blower housing and blower wiring structure of the disclosure, it is possible to thin (downsize) the blower housing in the axial direction. Moreover, according to the blower of the disclosure, since the blower housing can be thinned (downsized) in the axial direction, the blower itself can also be thinned (downsized) in the axial direction.

DESCRIPTION OF PREFERRED EMBODIMENTS

A blower housing, a blower wiring structure, and a blower as an embodiment are described with reference to the drawings. The embodiment presented below is a mere exemplification. There is no intention to preclude various modifications and application of a technology, which are not explicitly stated in the embodiment below. The configurations of the embodiment can be modified and carried out in various manners within the scope that does not depart from the purport of the configurations. Moreover, a selection can be made from the configurations as needed, or the configurations can be combined as appropriate.

The blower of the embodiment is a fan including a motor. Specifically, this blower is a fan that includes an impeller fixed to a rotary shaft of a motor and blows gas (such as air) by rotation of the impeller. In the following description, a direction in which the rotary shaft extends (a rotary shaft direction) is defined as an axial direction/axial, and a direction that is orthogonal to the axial direction and is away from the rotary shaft and a direction toward the rotary shaft are defined as a radial direction/radially/radial. Moreover, in the radial direction, the rotary shaft side is defined as a radially inner side/radially inward, and the opposite side (a side away from the rotary shaft) is defined as a radially outer side/radially outward. A direction that is orthogonal to the axial direction and is around the rotary axis is defined as a circumferential direction.

[1. Configuration]

Figure 1:
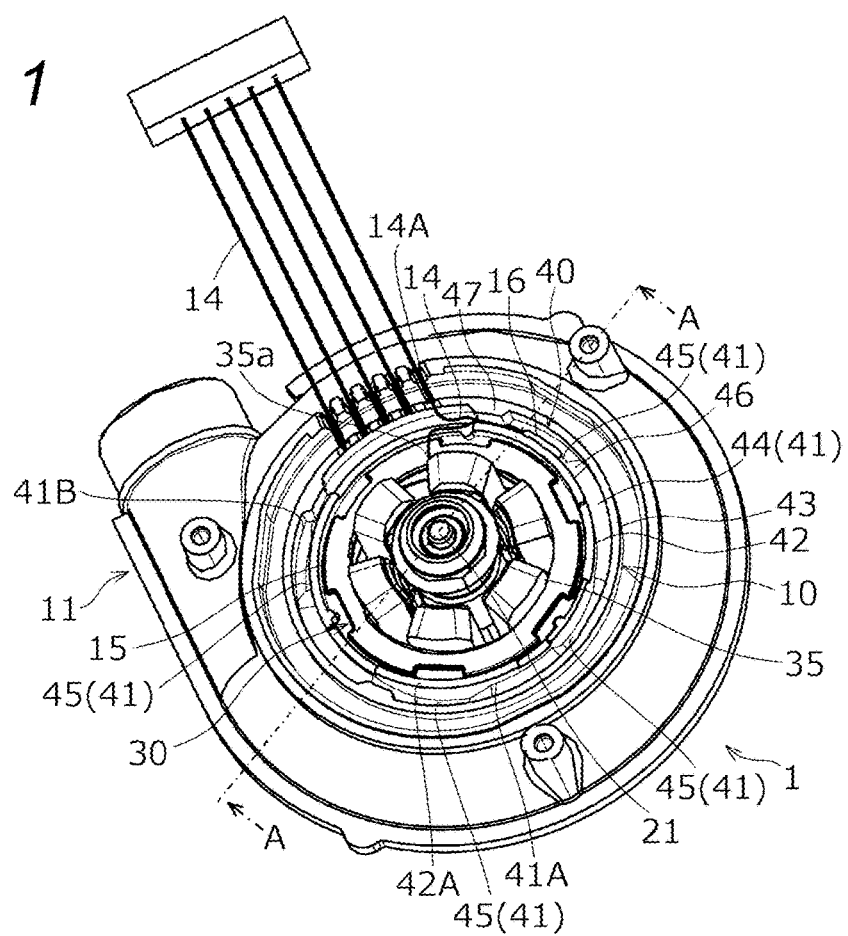
FIG. 1 is a perspective view for explaining a blower according to an embodiment.
Figure 2:
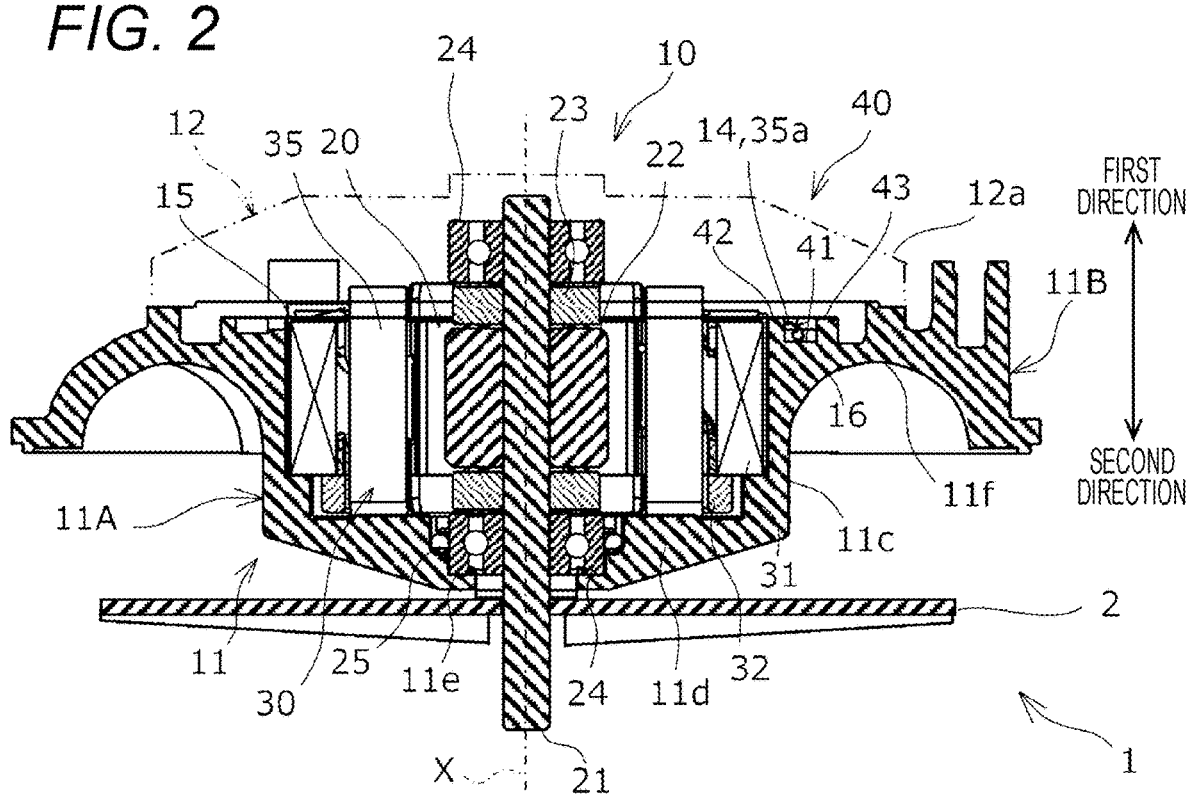
FIG. 2 is a cross-sectional view for explaining a blower housing applied to the blower of FIG. 1.

FIG. 1 is an external perspective view for explaining the configuration of a blower 1 according to the embodiment, and omits an end bell 12 (refer to FIG. 2) from the illustration to have an understanding of the internal structure. FIG. 2 is a cross-sectional view on arrows A-A of FIG. 1. As illustrated in FIGS. 1 and 2, the blower 1 of the embodiment is a fan that blows air by the rotation of an impeller 2 (refer to FIG. 2).

The blower 1 includes the impeller 2, a motor 10 as a driving source of the impeller 2, and a blower housing 11 (hereinafter simply referred to as the "housing 11") forming a case body that accommodates the impeller 2 and the motor 10. The motor 10 is an inner rotor brushless motor, and is configured in such a manner that a rotor 20 that rotates integrally with a shaft 21 (a rotary shaft) having a rotation center X (refer to FIG. 2) and a stator 30 located radially outward (hereinafter also simply referred to as "outward/outer side") of the rotor 20 are integrated in the housing 11.

As illustrated in FIG. 2, the rotor 20 includes a magnet 22 fixed to the shaft 21 and two balancers 23 that sandwich the magnet 22 in the axial direction, and is fixed by a bearing 24 in such a manner as to be rotatable relative to the housing 11 and the end bell 12. The stator 30 includes a stator core 31 fixed to an inner peripheral surface of the housing 11, and coils 35 wound around the stator core 31 via an insulator 32. In the embodiment, the stator 30 including six coils 35 spaced at even intervals in the circumferential direction is taken as an example.

A lead 14 for supplying power to a winding 35a forming each of the coils 35 is connected by soldering to an end portion (start wire or end wire) of the winding 35a. Moreover, end portions (end wires or start wires) of the windings 35a on a side where the lead 14 is not connected are connected together by soldering the end portions of the windings 35a. Hereinafter, a portion in which the end portion of the winding 35a and a conductive wire including the winding 35a are soldered is referred to as a "solder portion 16." Note that both of the winding 35a and the lead 14 are elements included in a "conductive wire" in the claims.

The impeller 2 is fixed to one end portion of the shaft 21. The impeller 2 is an impeller for blowing air, and is configured, including, for example, a disk-shaped base portion fixed to the shaft 21 and a plurality of fins provided radially and erected on a surface of the base portion. When the motor 10 operates and the shaft 21 rotates, then the impeller 2 rotates integrally with the shaft 21.

The housing 11 includes a bottomed cylindrical portion 11A and an annular portion 11B as parts for accommodating the impeller 2 and the motor 10. The cylindrical portion 11A is a part that forms a placement space for the motor 10 (that is, the rotor 20 and the stator 30) therein, and the annular portion 11B is a part that is outward of the cylindrical portion 11A and forms a placement space for the impeller 2 between the annular portion 11B and an unillustrated cover member. The annular portion 11B is formed continuously outward from an outer peripheral surface of a side wall portion 11c of the cylindrical portion 11A. An upper end portion of the annular portion 11B functions as a flange portion 11f extending outward from the side wall portion 11c.

The interior of the cylindrical portion 11A, that is, a space surrounded by the side wall portion 11c and a bottom portion 11d is the placement space for the rotor 20 and the stator 30. Hereinafter, for convenience, in the axial direction, a side on which the end bell 12 is placed on the housing 11 is referred to as a "first direction," and the opposite side is referred to as a "second direction." Moreover, assuming that the axial direction is an up-and-down direction, the first direction side is referred to as "up/upper," and the second direction side is referred to as "down/lower."

The housing 11 includes an opening portion 15 for accommodating the stator 30 of the motor 10. Specifically, the opening portion 15 is used to accommodate the stator 30 in the axial direction. The opening portion 15 is a part surrounded by an upper edge of the side wall portion 11c at an upper end of the cylindrical portion 11A, and forms an opening through which the rotor 20 and the stator 30 are placed in the cylindrical portion 11A. The opening portion 15 has an approximately circular outline as viewed in the first direction. Note that the approximately circular shape is not limited to a perfect circle (circular shape) and includes a shape that can be regarded as a circular shape. For example, the opening portion 15 may have a polygonal shape that can be regarded as a circular shape as viewed in the first direction. The opening portion 15 of the cylindrical portion 11A is covered with the end bell 12 as schematically indicated by chain double-dashed lines in FIG. 2. The end bell 12 is a lid member that is assembled with the housing 11. In the embodiment, an outer peripheral end portion 12a of the end bell 12 is placed on the flange portion 11f of the housing 11, and the end bell 12 is fixed to the housing 11.

Moreover, in the housing 11 of the embodiment, the bottom portion 11d of the cylindrical portion 11A is provided with a through-hole through which the shaft 21 is inserted and a stepped portion 11e to which the bearing 24 and an O-ring 25 are fixed. As illustrated in FIG. 2, a lower end portion of the shaft 21 protrudes through a lower surface side of the housing 11 from the through-hole, and the impeller 2 is fixed to the lower end portion. The cover member is mounted on the lower surface side of the housing 11.

In the embodiment, as illustrated in FIG. 2, the case body of the blower 1 is formed by assembling the end bell 12 and the cover member with the housing 11. In other words, the housing 11 is one of components making up the case body. The case body has an approximately circular appearance as viewed in the axial direction, and the impeller 2 and the motor 10 are placed (accommodated) in the case body. The dimensions of the case body of the blower 1 are set in such a manner that at least the impeller 2 and the motor 10 can be integrated.

As illustrated in FIG. 1, groove portions 14A are formed on an upper surface side of the housing 11 to allow a plurality of (five, here) the leads 14 to be drawn out from inside the housing 11 and the end bell 12, respectively. The number of the groove portions 14A and the number of the leads 14 are the same, and it is configured in such a manner that the leads 14 can be appropriately routed outward from inside the housing 11 by placing the leads 14 in the groove portions 14A, respectively. In the embodiment, three of the five leads 14 are connected to the windings 35a, and the remaining two are connected to, for example, an electronic device other than the windings 35a, such as a temperature sensor. Note that the number of the leads 14 and the connection target are not limited to the above.

The housing 11 includes an accommodating portion 40 for accommodating the above solder portions 16. The accommodating portion 40 is a part formed radially outward of the opening portion 15 in such a manner as to surround the outer periphery of the stator 30. The accommodating portion 40 of the embodiment is formed around the opening portion 15 in such a manner as to surround the outer periphery of the stator 30, in other words, is formed in such a manner as to surround the outer periphery of the stator 30 in an annular fashion, and is provided on the upper surface side of the housing 11, and accommodates the solder portions 16 between the housing 11 in which the stator 30 is placed and the end bell 12.

The accommodation performance that can accommodate the solder portions 16 at predetermined positions and the insulation performance that can electrically insulate the solder portions 16 and the stator 30 are required for the accommodating portion 40 as its basic performance. The accommodating portion 40 of the embodiment is configured in such a manner as to allow a downsizing (thinning in the axial direction) of the housing 11 in addition to achieving the basic performance.

As described above, the solder portions 16 accommodated in the accommodating portion 40 are parts each obtained by soldering the end portion of the winding 35a and the conductive wire. Specifically, the solder portions 16 include two types: first solder portions 16 each obtained by soldering the end portion of the winding 35a and the lead 14; and a second solder portion 16 obtained by soldering the end portions of the windings 35a (for example, a bunch of the end portions of the three-phase windings 35a). In other words, the "conductive wires" include the lead 14 that is connected to the end portion of the winding 35a, and the end portion of one winding 35a that is connected to the end portion of another winding 35a. Note that although a plurality of the solder portions 16 can be accommodated in the accommodating portion 40, only one solder portion 16 is illustrated and the others are omitted in the drawing.

Figure 3:
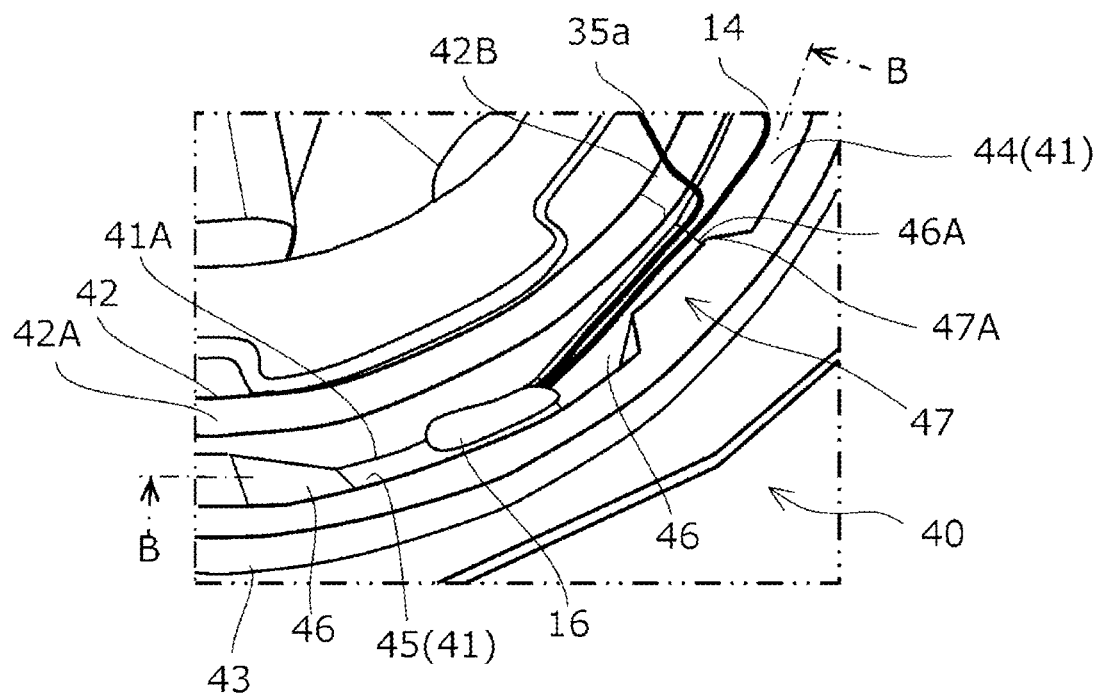
FIG. 3 is an enlarged perspective view of an accommodating portion of the blower housing of FIG. 2.
Figure 4:
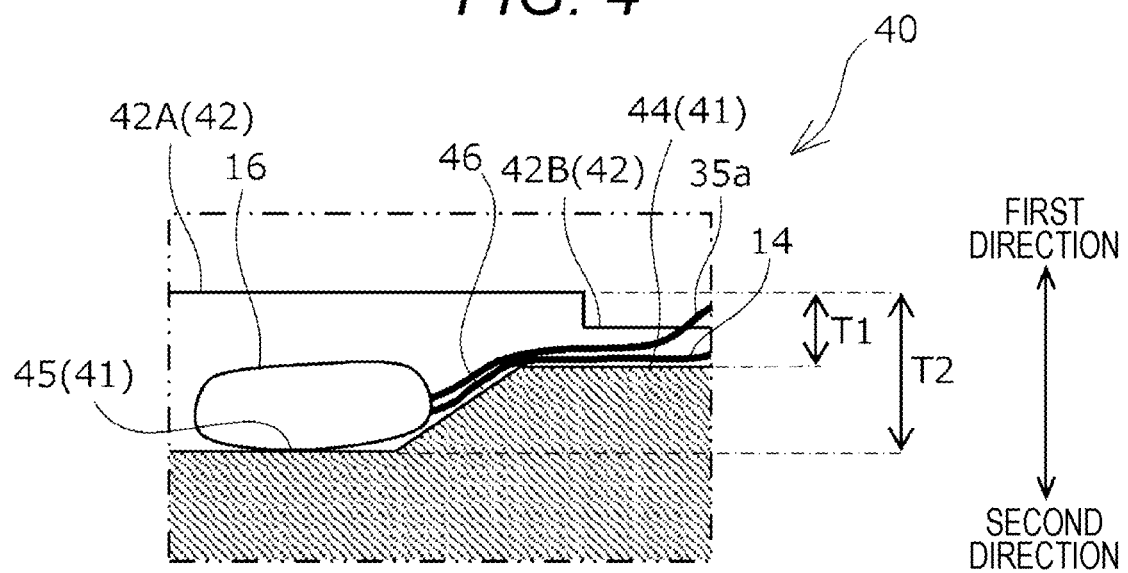
FIG. 4 is a cross-sectional view illustrating the accommodating portion of FIG. 3 in cross section along a circumferential direction.

FIG. 3 is an enlarged view of the accommodating portion 40. FIG. 4 is a cross-sectional view on arrows B-B of FIG. 3, and illustrates the accommodating portion 40 in cross section along the circumferential direction. As illustrated in FIGS. 1 to 4, the accommodating portion 40 includes at least a bottom surface portion 41 forming a surface on which the conductive wires (the windings 35a and/or the leads 14) and the solder portions 16 are placed, and an inner wall portion 42 that is placed (for example, erected) from a radially inner edge 41A (hereinafter referred to as the inner edge 41A) of the bottom surface portion 41 toward the first direction.

The bottom surface portion 41 is a bottom surface of the accommodating portion 40, and is annular (circular ring-shaped in the embodiment) as viewed in the first direction. The accommodating portion 40 of the embodiment further includes an outer wall portion 43 located radially outward of the inner wall portion 42. The inner edge 41A can be said to be an inner edge on an opening portion 15 side of the bottom surface portion 41. The outer wall portion 43 is placed (for example, erected) from a radially outer edge 41B (hereinafter referred to as the outer edge 41B) of the bottom surface portion 41 toward the first direction. The outer edge 41B can be said to be an outer edge opposite to the inner edge of the bottom surface portion 41.

Both of the inner wall portion 42 and the outer wall portion 43 of the embodiment are erected upward (in the first direction in the axial direction) on the upper surface side of the housing 11. Both of the inner wall portion 42 and the outer wall portion 43 are annular (circular ring-shaped in the embodiment) as viewed in the first direction. In other words, it can also be said that the bottom surface portion 41 is provided between the inner wall portion 42 and the outer wall portion 43. Note that the radial dimension of the bottom surface portion 41 (spacing in the radial direction between the inner wall portion 42 and the outer wall portion 43) is set at a length that sufficiently secures placement spaces for the conductive wires and the solder portions 16.

As illustrated in FIGS. 1, 3, and 4, the bottom surface portion 41 includes first portions 44 in each of which the conductive wire/conductive wires are placed and second portions 45 in each of which the solder portion 16 is placed. The first portions 44 and the second portions 45 are parts of the bottom surface portion 41, and the first portions 44 are different from the second portions 45 in position in the circumferential direction of the accommodating portion 40 and in position in the axial direction. Specifically, as illustrated in FIGS. 3 and 4, the second portions 45 are portions of the bottom surface portion 41 that are recessed to a position lower and deeper than the first portions 44 (a position on the second direction side in the axial direction). The first portions 44 can also be said to be portions of the bottom surface portion 41 other than the second portions 45. The solder portions 16 are not placed on the first portions 44.

In the embodiment, the first portions 44 and the second portions 45 are connected via inclined surfaces 46 in the circumferential direction. Attention is focused on one second portion 45. The upward inclined surface 46 is continuously formed at each end portion of the second portion 45 in the circumferential direction. Then, the first portion 44 is formed continuously with an edge, which is opposite to the second portion 45, of each of the inclined surfaces 46 (that is, an upper edge at the top of each of the slopes). In other words, the first portions 44 are placed adjacent to the second portion 45 in the circumferential direction, each across the inclined surface 46.

The inclined surfaces 46 are portions that are formed in an inclined fashion and smoothly connect the first portions 44 and the second portion 45. The inclined surfaces 46 are parts of the bottom surface portion 41, and are portions different from the first portions 44 and the second portion 45. On the inclined surfaces 46, the conductive wire may be placed, or the solder portion 16 may be placed. Note that since the placement area of the solder portion 16 is only the second portion 45, the expression mentioned here, "the solder portion 16 is placed on the inclined surface 46," means that a part of the solder portion 16 placed on the second portion 45 is also placed on the inclined surface 46.

As illustrated in FIG. 1, the bottom surface portion 41 of the accommodating portion 40 includes a plurality of (four, here) the second portions 45 spaced apart from one another in the circumferential direction. Although omitted in FIG. 1, one solder portion 16 is placed on each of the second portions 45. Specifically, the first solder portion 16 described above is placed on each of three of the four second portions 45, and one second solder portion 16 described above is placed on the remaining one second portion 45.

All the second portions 45 may have a common circumferential dimension, or all or a part of the second portions 45 may have different circumferential dimensions. For example, the first solder portions 16 may be different in the circumferential dimension from the second solder portion 16. Therefore, the circumferential dimension of the second portions 45 for placing the first solder portions 16 may be different from the circumferential dimension of the second portion 45 for placing the second solder portion 16. Note that the type and number of the conductive wires placed on each of the first portions 44 are not particularly limited, and for example, one or more windings 35a may be placed, or one lead 14, or the winding 35a and the lead 14, may be placed.

The inner wall portion 42 functions as a partition for mechanically separating and electrically insulating the solder portions 16 accommodated in the second portions 45 from the stator 30 in the cylindrical portion 11A. From the viewpoint of securing the function as the partition, it is preferable that the axial dimension (that is, the height of the wall) of the inner wall portion 42 be set to be long. On the other hand, when the axial dimension of the inner wall portion 42 is too long, the axial dimension (thickness) of the housing 11 increases, and therefore, it is preferable to restrict the axial dimension of the inner wall portion 42 from the viewpoint of downsizing (realization of thinning in the axial direction) of the housing 11. Note that as illustrated in FIG. 4, the axial dimension of the inner wall portion 42 is an axial length (height) from the bottom surface portion 41 to an upper surface 42A of the inner wall portion 42. The upper surface 42A is an end surface located on the upper side (the first direction side) of the inner wall portion 42.

From the above viewpoints of both securing the function as the partition and thinning, the axial dimension of the inner wall portion 42 is set in such a manner as to satisfy the following conditions 1 and 2:

Condition 1: An axial dimension T1 from the first portion 44 to the upper surface 42A of the inner wall portion 42 is greater than the axial thickness of the conductive wire placed on the first portion 44, and less than the axial thickness of the solder portion 16.

Condition 2: An axial dimension T2 from the second portion 45 to the upper surface 42A of the inner wall portion 42 is greater than the axial thickness of the solder portion 16.

The condition 1 is set as a condition that restricts the dimension T1 as much as possible in addition to securing a minimum dimension that allows the conductive wire to be placed on the first portion 44 in a state where the inner wall portion 42 separates the conductive wire from the stator 30 (that is, securing the accommodation performance). Although a state in which the solder portion 16 is placed on the first portion 44 is not assumed, the axial thickness of the solder portion 16 is used as a reference to limit the dimension T1. Note that the expression mentioned here, the "axial thickness of the solder portion 16," is the length of a portion corresponding to the outer diameter when the shape of the solder portion 16 is regarded as an approximately circular cylinder. In reality, the shape of the solder portion 16 is not necessarily an approximately circular cylinder, and therefore, the "axial thickness of the solder portion 16" can also be said to be an axial dimension (height) of when the solder portion 16 is placed on the bottom surface portion 41.

As described above, since one or more windings 35a, one lead 14, or the winding 35a and the lead 14 may be placed on the first portion 44, the axial thickness of the conductive wire may be any of the outer diameter of the one winding 35a or the outer diameter of the one lead 14, or the total axial thickness of the plurality of conductive wires piled up in the axial direction.

When only one winding 35a or lead 14 is placed on the first portion 44, the "axial thickness of the conductive wire" is the outer diameter of the one winding 35a or the outer diameter of the one lead 14. Moreover, when two or more windings 35a are placed on the first portion 44, or when the winding 35a and the lead 14 are placed, there is a possibility that the plurality of conductive wires is piled up in the axial direction. Therefore, in these cases, the "axial thickness of the conductive wire" means the total axial thickness of the conductive wires being the plurality of conductive wires piled up in the axial direction.

The condition 2 is set as a condition that secures, as the dimension T2, a minimum dimension that allows the inner wall portion 42 to separate the solder portions 16 from the stator 30 (that is, securing the accommodation performance). Since an upper limit to the axial dimension of the inner wall portion 42 is set on the basis of the above condition 1, the dimension T2 is realized in consideration of both the position of the upper surface 42A of the inner wall portion 42 in the axial direction and the depth at which the second portions 45 are recessed.

The "axial thickness of the solder portion 16" is as defined above. When the dimension T2 is less than the axial thickness of the solder portion 16, electrical insulation may be insufficient since the solder portions 16 cannot be separated from the stator 30 by the inner wall portion 42. In other words, the condition 2 is set to secure sufficient electrical insulation. Note that since the windings 35a and the leads 14 are covered with an insulating material except for the solder portions 16, the electrical insulation performance can be secured even if portions other than the solder portions 16 are not separated by the inner wall portion 42.

As described above, the axial thickness of the conductive wire is different between a case of the outer diameter of one winding 35a or one lead 14 and a case of the total axial thickness of the conductive wires being a plurality of conductive wires piled up in the axial direction. Moreover, the axial thickness of the solder portion 16 may also vary. Therefore, the dimension T1 and the dimension T2 can be appropriately set in such a manner as to satisfy both the above conditions 1 and 2 on the basis of the axial thickness of the conductive wire and the dimension assumed to be the axial thickness of the solder portion 16. As an example, the dimension T1 and the dimension T2 may be set on the basis of a maximum dimension assumed to be the axial thickness of the conductive wire and the axial thickness of the solder portion 16.

As illustrated in FIGS. 1 to 4, the inner wall portion 42 is provided with a plurality of notch portions 42B formed by notching an upper end side of the inner wall portion 42. The notch portions 42B are parts having an intentionally reduced axial dimension (restricted height) of the inner wall portion 42 to facilitate drawing of the winding 35a from the radially inner side to the outside of the inner wall portion 42. In the embodiment, the plurality of notch portions 42B is spaced at even intervals in the circumferential direction of the accommodating portion 40. It is preferable that the position of each of the notch portions 42B in the circumferential direction be set at a position corresponding to the first portion 44 (partly or generally the same position as the position of the first portion 44 in the circumferential direction). Note that since the solder portion 16 is not placed on the first portion 44, the electrical insulation performance is maintained even if the axial dimension of the inner wall portion 42 is reduced by the notch portion 42B.

Moreover, as illustrated in FIGS. 1 to 3, the accommodating portion 40 includes a fixing portion (a press-fitting portion 47, here) that fixes (for example, press-fits) the conductive wire placed in the accommodating portion 40. Among the conductive wires and the solder portions 16, which are placed on the bottom surface portion 41, a conductive wire placed in the press-fitting portion 47 is fixed in the accommodating portion 40. In other words, the conductive wires and the solder portions 16, which are located in portions of the accommodating portion 40 other than the press-fitting portion 47, are in an unfixed state (in a free state of being simply placed).

The press-fitting portion 47 is formed in such a manner as to reduce the spacing in the radial direction between the inner wall portion 42 and the outer wall portion 43. The press-fitting portion 47 of the embodiment is provided as a part protruding inward from a surface facing a radially inner side of the outer wall portion 43. The spacing in the radial direction between the inner wall portion 42 and the outer wall portion 43 is reduced by a dimension of the inward protrusion of the press-fitting portion 47 from the outer wall portion 43. Note that the dimension of the inward protrusion of the press-fitting portion 47 from the outer wall portion 43 is set at an appropriate dimension that allows the conductive wire to be press-fitted.

The press-fitting portion 47 is a part where the conductive wire is press-fitted, and therefore is formed at a position overlapping the first portion 44 as viewed in the first direction. As illustrated in FIG. 3, it is preferable that in the housing 11 of the embodiment, the inclined surface 46 and the press-fitting portion 47 be placed at positions where they overlap each other at least partly as viewed in the axial direction. For example, end portions 46A and 47A opposite to end portions, which are closer to the second portion 45 in the circumferential direction, of the inclined surface 46 and the press-fitting portion 47 in FIG. 3 are placed at the same position in the circumferential direction.

Note that a procedure for assembling the above-mentioned housing 11 in FIGS. 1 to 4 is additionally described. When the housing 11 is assembled, the rotor 20 and the stator 30 are placed in the cylindrical portion 11A of the housing 11 first. Next, the windings 35a and the conductive wires are soldered. Then, the solder portions 16 and the conductive wires are placed in the accommodating portion 40, and the conductive wire placed in the press-fitting portion 47 is press-fitted. The end bell 12 is then assembled with the housing 11 to cover the opening portion 15.

Finally, the blower wiring structure is described. The blower wiring structure is a wiring structure provided to the blower 1, and includes specifically the above-mentioned housing 11 and the stator 30 accommodated in the housing 11. The blower wiring structure indicates a structure itself in which the windings 35a of the stator 30 and the solder portions 16 where the above conductive wires are soldered are accommodated in the accommodating portion 40 of the above-mentioned housing 11.

Note that the blower 1 of the embodiment is configured, including the blower wiring structure, and the impeller 2 fixed to the shaft 21 (the rotary shaft) of the motor 10.

[2. Effects]

(1) In the above-mentioned housing 11, the accommodating portion 40 that is formed in such a manner as to surround the outer periphery of the stator 30 is provided radially outward of the opening portion 15 through which the stator 30 of the motor 10 is accommodated. In the accommodating portion 40, the second portions 45, on each of which the solder portion 16 is placed, of the bottom surface portion 41 are recessed up to the position that is lower and deeper than the first portions 44 on each of which the conductive wires (the winding(s) 35a and/or the lead 14) are placed. Consequently, the axial dimension of the inner wall portion 42 can be restricted as compared with the known structure in which the conductive wire and the solder portion 16 are accommodated at the same position in the axial direction. Therefore, the housing 11 can be thinned (downsized) in the axial direction in addition to achieving the basic performance including the accommodation performance that can accommodate the solder portions 16 at the predetermined positions and the insulation performance that can electrically insulate the solder portions 16 and the stator 30.

(2) The accommodating portion 40 in the above-mentioned housing 11 may include the fixing portion (the press-fitting portion 47, here) that is formed in such a manner as to reduce the spacing in the radial direction between the inner wall portion 42 and the outer wall portion 43, in which the conductive wire is fixed. In this case, the conductive wire placed in the fixing portion can be fixed, and therefore, it is possible to enhance the retention of retaining a state in which the solder portions 16 are accommodated in the accommodating portion 40.

(3) Moreover, in the accommodating portion 40 in the above-mentioned housing 11, the first portions 44 and the second portions 45 of the bottom surface portion 41 may be connected via the inclined surfaces 46 in the circumferential direction of the accommodating portion 40. The inclined surfaces 46 allow the conductive wires to be directed obliquely downward from the first portions 44 toward the second portions 45, which facilitates the guidance of the conductive wires and the solder portions 16 toward the second portions 45. Hence, it makes it easier to place the solder portions 16 on the second portions 45.

Note that the accommodating portion 40 may be formed in such a manner as to gradually increase the axial thickness of the each of the inclined surfaces 46 from one side to the other side of the inclined surface 46 in the circumferential direction by, for example, integral molding with resin. Consequently, the thickness can be secured further as compared with a case where the first portions 44 and the second portions 45 are connected in a stepwise fashion, not via the inclined surfaces 46, and therefore, the stiffness of the housing 11 can be improved.

(4) Furthermore, in the above-mentioned housing 11, the press-fitting portion 47 and the inclined surface 46 may be placed at the positions where they overlap each other at least partly as viewed in the axial direction. When the press-fitting portion 47 and the inclined surface 46 are placed at the positions where they overlap each other at least partly as viewed in the axial direction, it facilitates maintaining a state in which the conductive wire is placed along the inclined surface 46 (making it hard for the conductive wire to lift) when the conductive wire is press-fitted in the press-fitting portion 47. Therefore, it makes it easier to guide the conductive wire and the solder portion 16 toward the second portion 45 and to stably place the solder portion 16 on the second portion 45.

(5) Moreover, in the above-mentioned housing 11, the bottom surface portion 41 may include the plurality of second portions 45, and the solder portions 16 may be placed, one on each of the second portions 45. Consequently, since each of the plurality of the solder portions 16 can be individually placed on its respective second portion 45, it facilitates securing of the accommodation performance and the insulation performance.

(6) According to the blower wiring structure including the above-mentioned housing 11 and the stator 30 accommodated in the housing 11, in which the conductive wires (the windings 35a and/or the leads 14) and the solder portions 16 are accommodated in the accommodating portion 40 of the housing 11, at least an effect similar to the effect described of the housing 11 in the above (1) can be obtained. Moreover, the blower wiring structure including the housing 11 having the configurations described in the above (2) to (5) can also obtain effects similar to the effects described in the above (2) to (5).

(7) Furthermore, according to the blower 1 including the blower wiring structure including the above-mentioned housing 11 and the impeller 2 fixed to the shaft 21 of the motor 10, at least an effect similar to the effect described of the housing 11 in the above (1) can be obtained. In other words, the housing 11 can be thinned (downsized) in the axial direction, and therefore, the blower 1 itself can also be thinned (downsized) in the axial direction. Note that the blower 1 is equipped with the blower wiring structure including the housing 11 having the configurations described in the above (2) to (5), and therefore, the effects similar to the effects described in the above (2) to (5) can also be obtained.

[3. Others]

The housing 11, the blower wiring structure, and the blower 1, which are described above, are examples, and are not limited to the above-mentioned configurations.

For example, the accommodating portion 40 may be structured without the outer wall portion 43 and the press-fitting portion 47. Also in this case, the inner wall portion 42 is formed with a reduced axial dimension, and therefore, the effect of thinning (downsizing) the housing 11 in the axial direction can be obtained. Moreover, the bottom surface portion 41 may not include the inclined surfaces 46, in other words, the first portions 44 may be placed adjacent to the second portions 45 not across the inclined surfaces 46.

Moreover, the end portion 47A of the press-fitting portion 47 and the end portion 46A of the inclined surface 46 may be set at different positions in the circumferential direction. Also in this case, the retention of the solder portion 16 can be enhanced by fixing the conductive wire placed in the press-fitting portion 47, and the inclined surface 46 can direct the conductive wire. Therefore, an effect of easily guiding the conductive wire and the solder portion 16 toward the second portion 45 can be obtained.

Furthermore, the bottom surface portion 41 may include only one second portion 45. In this case, a plurality of the solder portions 16 may be placed on one second portion 45.

Moreover, the type of motor is not limited to an inner rotor brushless motor, and an application may be made to an outer rotor motor, or an application may be made to a brushed motor when a lead is used.

An application target of the above-mentioned housing 11 including the accommodating portion 40 is not limited to a blower, and an application can be made to any device whose housing is required to be thinned (downsized) in the axial direction.

Examples of a target other than a blower to which the housing including the accommodating portion can be applied include a resin gearbox.

The invention claimed is:

1. A blower housing forming a case body of a blower including a motor, the blower housing comprising:
   an opening portion configured to accommodate a stator of the motor; and
   an accommodating portion formed outward of the opening portion in a radial direction in such a manner as to surround an outer periphery of the stator, the accommodating portion being configured to accommodate a winding of the stator and a solder portion where conductive wires including the winding are soldered, wherein
   the accommodating portion includes: a bottom surface portion forming a surface where the conductive wires and the solder portion are placed; and an inner wall portion placed from an inner edge of the bottom surface portion in the radial direction toward a first direction in an axial direction of the stator,
   the bottom surface portion includes: a first portion where the conductive wire is placed; and a second portion where the solder portion is placed,
   the second portion is recessed to a position deeper than the first portion in a second direction in the axial direction, and
   a dimension in the axial direction from the first portion to an upper surface of the inner wall portion is set to be greater than a thickness of the conductive wire in the axial direction and less than a thickness of the solder portion in the axial direction, and a dimension in the axial direction from the second portion to the upper surface of the inner wall portion is set to be greater than the thickness of the solder portion in the axial direction.

2. The blower housing according to claim 1, wherein the accommodating portion includes: an outer wall portion placed from an outer edge of the bottom surface portion in the radial direction toward the first direction; and a fixing portion formed in such a manner as to reduce spacing in the radial direction between the inner wall portion and the outer wall portion, in which the conductive wire is fixed.

3. The blower housing according to claim 2, wherein the first portion and the second portion are connected via an inclined surface in a circumferential direction of the accommodating portion.

4. The blower housing according to claim 3, wherein the fixing portion and the inclined surface are placed at positions where the fixing portion and the inclined surface overlap each other at least partly as viewed in the axial direction.

5. The blower housing according to claim 1, wherein the bottom surface portion includes a plurality of the second portions, and
the solder portion is placed on each of the second portions.

6. A blower wiring structure comprising:
the blower housing according to claim 1; and
the stator accommodated in the blower housing, wherein
the winding of the stator and the solder portion where the conductive wires including the winding are soldered are accommodated in the accommodating portion of the blower housing.

7. A blower comprising:
an impeller fixed to a rotary shaft of a motor; and
the blower wiring structure according to claim 6.

\* \* \* \* \*